United States Patent [19]

Payne

[11] 4,198,139

[45] Apr. 15, 1980

[54] ELECTROSTATIC CAMERAS

[76] Inventor: John M. Payne, Northborough, Peterborough, England

[21] Appl. No.: 896,823

[22] Filed: Apr. 17, 1978

[30] Foreign Application Priority Data

Apr. 16, 1977 [GB] United Kingdom ............... 15873/77
Dec. 13, 1977 [GB] United Kingdom ............... 51901/77

[51] Int. Cl.[2] ......................... G03G 15/00; G03B 9/02
[52] U.S. Cl. ......................................... 354/3; 354/270
[58] Field of Search ........................... 354/3, 270, 202; 355/3 R, 3 P, 27, 29

[56] References Cited

U.S. PATENT DOCUMENTS

| | | | |
|---|---|---|---|
| 2,380,216 | 7/1945 | Carter | 354/270 |
| 2,598,732 | 6/1952 | Walkup | 354/3 X |
| 3,185,051 | 5/1965 | Goffe | 354/3 X |
| 3,592,115 | 7/1971 | Ando | 354/3 X |
| 3,673,936 | 7/1972 | Stone et al. | 354/3 |
| 3,680,955 | 8/1972 | Yata et al. | 354/3 X |
| 4,011,568 | 3/1977 | Oughton et al. | 354/3 |

FOREIGN PATENT DOCUMENTS

| | | | |
|---|---|---|---|
| 1236931 | 3/1967 | Fed. Rep. of Germany | 354/270 |

*Primary Examiner*—Donald A. Griffin
*Attorney, Agent, or Firm*—Allison C. Collard; Thomas M. Galgano

[57] ABSTRACT

A portable camera is described by which electrostatic photocopies can be obtained instead of conventional photographs. The camera includes conventional aperture and optical focusing means for producing an image, a surface on which the image is formed, electrode means for electrically charging the surface, an integral EHT generator for producing a high voltage pulse for application to the electrode, a shutter for controlling the passage of light to the surface and a means for applying a printing medium to the surface for retention thereon in dependence on the level of electrical charge remaining at different points over the surface after exposure to the light image.

Rollers and a reservoir of a suspension of printing medium particles serve to apply the printing medium to the surface and heated rollers or pressure rollers are used to fix the print.

A development electrode may be employed in the form of a grounded conductive plate or roller placed in the immediate vicinity of the electrical image to eliminate edge effect.

The surface on which the image is formed may comprise a zinc oxide coated paper or a plate coated with cadmium sulphide or selenium for producing an intermediate electrostatic image. Where zinc oxide coated paper is employed, the optical system must produce an inverted real optical image.

Distribution of charge is improved by incorporating a frame electrode at the same potential as the surface.

A transparent dotted screen may be inserted in front of the surface prior to image exposure so as to produce a plurality of isolated areas of charge on the surface to reduce charge migration and maintain charge and print density levels.

Uniformity of charge is compensated by an aperture in an opaque member which causes a fall-off in light intensity over the surface similar to the fall-off of charge intensity from the electrode.

21 Claims, 7 Drawing Figures

ELECTROSTATIC CAMERAS

FIELD OF INVENTION

Figure 1:
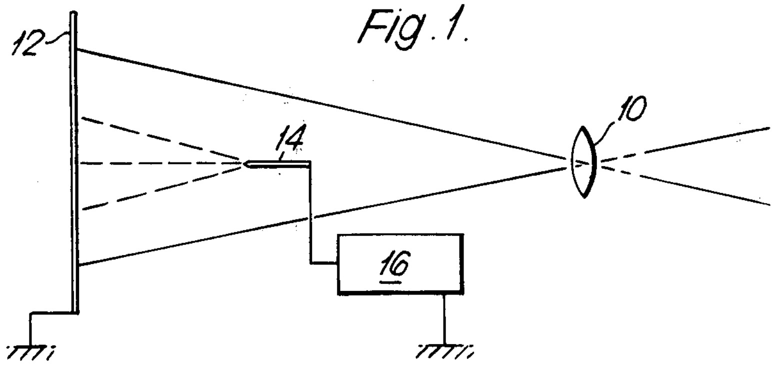

This invention concerns a portable camera adapted to produce an electrostatic photocopy instead of a photograph.

BACKGROUND OF THE INVENTION

Electrostatic photocopying has been applied to the copying of documents and the like and the various electrostatic photocopying processes are well known and are extensively used commercially to this end.

Prior Art

Japanese Patent specification No. 47-30808 describes a form of camera in which an electrostatic image is formed on a laminated plate situated in the camera in place of a conventional film, in which the electrical charge required for charging the laminated plate is obtained from a piezo-electric crystal source. While this camera is portable it does not provide a photograph in the normally accepted form.

U.S. Pat. No. 3,695,755 describes a photoelectrophoretic camera in which a charge is applied to a roll of film by charging a roller and a flat plate between which the film is passed, and does not include means for applying toner to the film after exposure.

U.S. Pat. No. 2,932,742 describes another form of electrostatic camera in which an electric field is formed between the paper and a zig-zag wire electrode, which in practice is found to produce an indescribable charge pattern on the sheet of paper.

U.S. Pat. No. 3,057,275 describes yet another electrostatic camera in which the charge is applied to the paper from a wire electrode and spread of charge is only achieved by relative movement between the paper and the electrode.

OBJECTS OF THE INVENTION

It is an object of the present invention to incorporate the features of an electrostatic photocopying process into a portable camera so that electrostatic photocopies of the image projected by the camera optics can be produced directly.

A camera which produces electrostatic photocopies of an optical image instead of conventional photographs will be referred to as an electrostatic camera to distinguish it from a conventional camera in which the optical image is formed on a sensitized film and in which the process of converting the light image into a conventional photograph is a chemical one.

The Invention

In one embodiment of the invention a portable electrostatic camera comprises a light-tight housing, a surface within the housing, an aperture for admitting light to form an optical image on the said surface, electrode means for electrically charging the surface within the housing, the electrode means being situated in front of the surface intermediate the aperture and the surface, a shutter for controlling the passage of light to said surface, whereby an electrical charge on said surface can be modified to form an electrical image corresponding to the optical image, and means for applying a printing medium to said surface for retention thereon in dependence on the level of electrical charge remaining at different points over said surface.

The surface may comprise a sheet of sensitized paper or film or a sensitized plate.

The printing medium or toner as it is commonly known may be a finely divided dry powder or a suspension of powder in a liquid and may be applied to the said surface in any convenient manner. Thus rollers and/or brushes or toner carrier beads may be used for distributing the finely divided particles of printing medium over the the charged surface. The print which adheres to the charged regions may be fixed by for example squeezing the sheet or plate between a pair of rollers or the like which may be heated if required, as determined by the characteristics of the toner employed.

Alternatively the sheet or plate bearing the electrical image may be passed through a bath containing a finely divided suspension of printing medium suspended in a liquid base and the printing medium which adheres to the charged areas on the surface may be fixed thereon by a fixing agent contained in the liquid base which evaporates off after the sheet or plate has been removed from the bath.

In all cases it has been found that a much improved full tone photograph is achieved by employing a development electrode i.e. a grounded conductive plate or roller which is placed in the immediate vicinity of the electrical image of the sensitized plate or sheet, the toner (wet or dry) being sandwiched between the sensitized surface and the development electrode. This eliminates the 'edge effect' and 'hollow' image effect which can be obtained when no development electrode is used.

The means for fixing the printing medium onto the surface preferably comprises roller means or the like forming part of an outlet in the camera housing for compressing the sheet or plate containing the said surface as it passes through the said outlet.

The said surface may be coated with a photosensitive coating such as zinc oxide. Where separate sheets or plates are employed these are preferably equal in size to the final print to be obtained from the electrostatic camera. Alternatively a roll of paper or film may be employed which can be drawn through the housing after exposure to reveal the section of the roll which has been charged and exposed and preferably means is provided for cutting this section of the roll after it has been pulled from the housing. The remainder of the roll can thus be left in the housing ready for future use. Alternatively or in addition the roll may be perforated at intervals along its length corresponding to the length of each section which is to be exposed, so that "prints" can be torn off.

In another embodiment of the invention the said surface may comprise a permanent plate or flexible belt which is coated with a layer of reactive material which when electrically charged becomes photosensitive (such as cadmium sulphide or selenium), and on which an electrical image is formed thereon corresponding to a light image incident thereon. This may be converted to a photocopy-photograph by first distributing printing medium thereon so as to cause the printing medium to adhere to the charged regions of the surface of the plate or belt which remain after exposure and means is provided for causing at least some of the adhering printing medium to be transferred from the said surface onto a sheet material such as paper or film, and means is provided for fixing the printing medium onto the sheet so as to produce the permanent electrostatic print thereon.

In another embodiment which also incorporates a coating of reactive material on a plate or belt on which an electrical charge pattern corresponding to a light image can be formed by electrically charging the coating and then exposing the charged surface to the light image, means is provided for causing the electrical image to be transferred to a sensitized sheet material such as paper coated for example with zinc oxide and means is provided for applying printing medium to the surface of the sensitized sheet material bearing the charge pattern resulting from the exposure and for fixing the printing medium thereon.

While the means for applying electrical charge to the said surface within the housing may comprise any convenient EHT source, according to a preferred feature of the invention, the means for charging the said surface comprises a piezo-electric crystal EHT generator in which the EHT voltage is produced by squeezing the piezo-electric crystal. The compact nature of this type of EHT generator lends itself to being fitted within an electrostatic camera housing.

As is well known, when the compressing forces on a piezo-electric crystal are removed, an equal and opposite polarity voltage is generated. Use may be made of this equal and opposite polarity voltage by providing means in the camera for applying this opposite polarity voltage to the reverse side of a plain sheet which has been laid in contact with the electrical charge image having printing medium adhering thereto. The transfer of printing medium from the said surface to the plain paper is thereby enhanced.

Conveniently the said surface is charged electrically in the first instance from an electrode situated in front of the said surface at a position intermediate the lens and the said surface, the electrode being connected to an output terminal of an EHT generator located within the housing. The electrode typically comprises a needle-like conductor attached to the upper end of a conducting support which is connected directly to one output terminal of the EHT generator, the other terminal of which is preferably grounded. If not incorporated within the generator, rectifying means is provided externally thereof to ensure that charge of only one polarity reaches the electrode. In the case of a piezo-electric crystal generator the rectifying means may be a switch or a rectifying diode.

Conveniently the needle-like electrode is situated on the axis of the optical system and is situated at a point therealong such as to minimize any out-of-focus shadow which may appear on the surface due to the presence of the needle electrode in front of the said surface.

Where it is important to produce a charge on the said surface which is as uniform as possible over the area of the surface at least on which the optical image is to fall, an electrically conductive frame may be located just in advance of the said surface on the same side thereof as is situated the electrode producing the corona discharge, so that the ionization from the corona discharge has to pass through the frame to reach the said surface, and the frame is maintained at the same electrical potential and polarity as the said surface.

A preferred shape for the frame is a rectangular loop of approximately the same dimensions as the length and breadth dimensions of the said surface which is to be exposed to the light image.

The advantage of a rectangular frame or loop is realized to the full if the discharging point of the electrode is situated at a distance from the said surface which, when measured along the normal to the surface from the electrode, is approximately equal to the mean distance between the discharging point of the electrode and the frame so that there is an equal attraction from the center of the surface as from the frame at earth potential.

Where a rectangular conductive frame is employed just in advance of the said surface, the size of the rectangular frame is selected as being just greater than the dimensions of a window situated at the same position as the rectangular frame, through which straight line moving ions from the corona discharge can just reach the extremities of the said surface without touching the edges of the window.

Alternatively the paper, or plate, or belt, may be charged by means of a very fine wire stretched across its width a small distance in front of it, which when a high voltage is applied produces a corona discharge which charges the sensitized paper, plate or belt over a narrow area extending in a narrow band across the surface in the vicinity of the charging wire. In order to charge the whole area, the paper, plate or belt can be moved past the wire while the charge is applied, or the wire itself can be moved relative to the paper etc. This mechanical movement may be achieved by or operated from the linkage that is used to actuate the EHT source.

Where the said surface comprises a sheet of opaque sensitized paper on which a photocopy print is to be formed direct, the optical system of the camera is preferably modified so as to produce an inverted real optical image on the said surface so as to produce a correct representation of the view presented to the camera optics. Typically an additional lens or prism may be used.

Where the surface on which the optical and electrical images are formed comprises a sensitized plate or belt on which an intermediate electrical image is obtained which is transferred to a sheet of plain paper or film using a charge transfer technique (or on which an intermediate print is obtained by depositing printing medium thereon which is then transferred directly to a sheet of plain paper or film), no inversion of the optical image is needed since in transferring the intermediate image or print to the plain paper or film, an appropriate inversion of the image is obtained so that the final print on the plain paper or film obtained after a transfer of charge or printing medium, is the correct way round.

A screen comprising a transparent sheet having formed thereon a large number of very small opaque equally spaced apart dots, may be inserted in front of the said surface and prior to the image exposure, substantially uniform light is caused to fall on the said surface through the transparent sheet. The action of the incident uniform light on the charged surface is such as to reduce the charge in the areas between the opaque dots as projected onto the said surface thereby leaving a large number of tiny isolated areas of charge on the said surface. Subsequent exposure to light after the screen has been removed will cause the charge on each of the dots to be dissipated to an extent determined by the amount of light falling thereon, and this causes an electrical image to be established which comprises a large number of incremental areas of charge. The advantage of this procedure is that the tendency for charge migration to occur from regions of high charge to regions of low charge (during and after exposure) is substantially reduced since the electrical image is broken up into a large number of tiny incremental areas each of which can be considered to be at uniform potential with regard to itself and which because it is separate from adjoining areas has little tendency to discharge towards areas of lower potential.

Preferably means is provided for automatically inserting the transparent screen in front of the said surface within the camera housing and automatically removing same after an initial exposure to uniform light, after which the light image is focused thereon.

As has hitherto been mentioned, for some applications, a second charge of opposite polarity will assist in the transfer of an intermediate electrical charge pattern or printing medium adhering thereto, from the said surface to plain paper, and in that event when the EHT generator is a piezo-electric powered source, which produces opposite polarity charges in succession when it is in turn subjected to a compression force and then relaxed, means is provided for conveying the one polarity charge to the charging electrode and the opposite polarity charge to a plate behind the said surface, during the transfer of charge or printing medium.

In addition or alternatively means may be provided for storing the unwanted polarity charge during the charging cycle so as to be available for assisting in the transfer of charge or printing medium from the said surface to plain paper during a later stage of the process.

A current limiting resistor may be located between a piezo-electric powered EHT generator and the charging electrode to reduce the 15,000 volts produced by a typical piezo-electric EHT generator to approximately 6000 volts at the electrode, which is more suitable for a zinc oxide treated surface. The value of such a resistor has been found to be of the order of 10 megohms and resistors of this value have substantially reduced the burning effect otherwise experienced.

The process of forming an electrostatic photocopy photograph described above involves the formation of an electrostatic charge over the surface of a sheet of paper or a plate and the subsequent exposure of the charged surface to an optical image of the object/scene which is to be photographed so as to form a corresponding charge pattern thereon to which printing medium (toner) will adhere differentially depending on the areas remaining charged after exposure. It will be evident that if the optical image is plain and evenly illuminated, the light intensity over the area of the image will be uniform and the resulting electrical charge pattern after exposure should also be uniform. This will only be the case if the electric charge is initially distributed evenly over the surface and the production of such an evenly charged area is difficult in practice.

It is known to situate a stretched wire in front of a plain surface and to move the one relative to the other while applying a high voltage to the wire so as to produce a large area of substantially uniform charge over the surface. However this approach is not very suitable for an electrostatic camera where space and weight requirements are such that it is undesirable to take up the space with the mechanisms for producing a constant high voltage and relative movement.

A single point corona discharge electrode produces a radial electric field with highest intensity at the centre and the result is that unless steps are taken such as by providing a frame electrode around the image area on the surface to which charge is applied, so as to cause a more even distribution of charge thereover, only a relatively small circular area of charge can be obtained on the surface.

Increasing the number of single point electrodes does not in fact help since each produces its own local electric field and a lattice of neutral zones is established due to the polar opposition of the adjoining like-polarity fields.

It is an object of a preferred feature of the invention to provide a simple and inexpensive device for compensating for the non-uniform electrical charge spread from a single point corona-discharge electrode.

According to a further preferred feature of the invention, this objective is achieved by inserting an opaque barrier between the focusing lens system of an electrostatic camera and the surface on which the image is to be formed, having an aperture the shape and dimensions of which are selected so that, together with the existing imperfections of the focusing lens system the variation of intensity of light over the said surface, when lit from a uniformly illuminated plain image is similar to the variation of electrical charge intensity over the same surface from a single point corona discharge electrode located in front thereof.

Where the optical intensity variation is also radial and is substantially uniform in all directions from the axis, the aperture is preferably circular although due to increased path length to the corner regions of a rectangular image surface, an aperture which is more rectangular than circular, may be found to be beneficial.

The aperture may be an opening in a sheet of metal or plastics material or may be a transparent region in an otherwise opaque sheet.

The success of this feature lies in the fact that by reducing the light level in the same proportion as the charge level is reduced in the outer radial regions, so the lower level of light incident thereon has the same discharging effect on the lower charged regions as does a higher level of light incident on the central more highly charged regions.

The axial position for the aperture is selected so that the aperture does not form a shadow or an in focus image on the said surface but merely reduces the amount of light travelling from the focusing lens system to the radially outer regions of the in focus plane.

Preferably means is provided for adjusting both the shape of the aperture and/or the axial position thereof so that final adjustments can be made using a uniformly illuminated field to produce the most uniformly discharged photocopy therefrom. The adjustments are preferably made during manufacture since once made, should not need to be altered in use.

It is believed that this feature when taken in combination with the other features described above will allow relatively large-area photocopy-photographs to be produced using a single point corona discharge electrode and portable high tension supply such as a piezo-electric crystal or capacitor discharge electronic circuit.

The invention will now be described by way of example with reference to the accompanying drawings.

IN THE DRAWINGS

Figure 2:
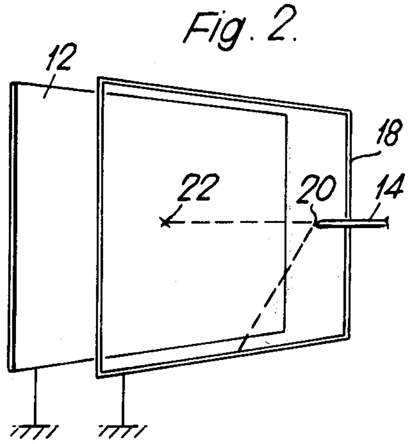
Figure 3:
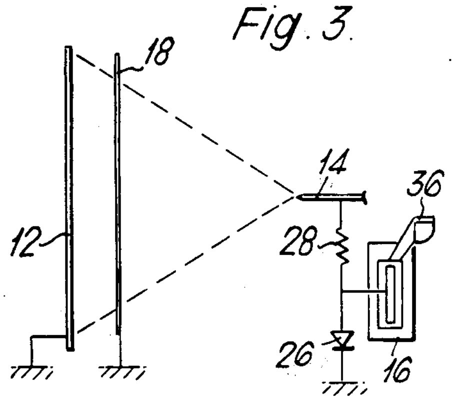
Figure 4:
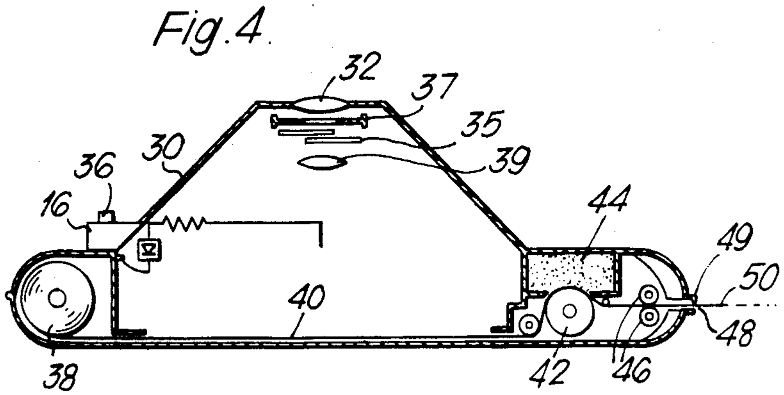
Figure 5:
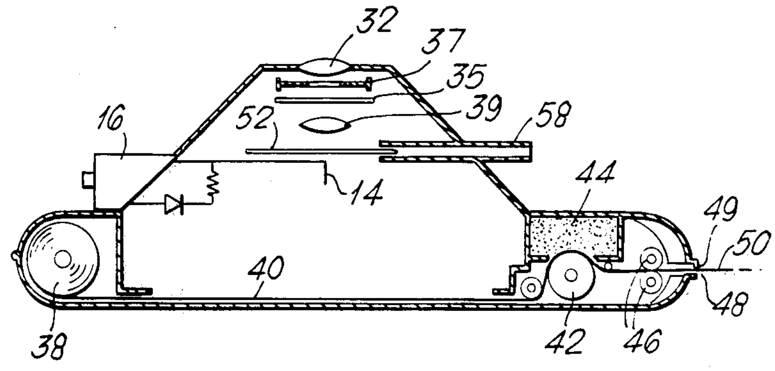
Figure 6:
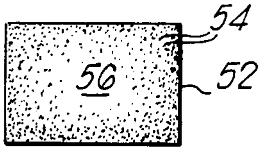
Figure 7:
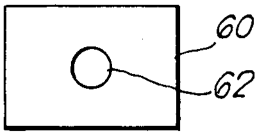

FIG. 1 is a diagrammatic representation of the principles of electrostatic charging employed in a camera embodying the invention, FIG. 2 illustrates diagrammatically an improvement for fitting to the basic camera the principle of which is shown in FIG. 1, FIG. 3 is a diagrammatic representation of a camera embodying the invention, FIG. 4 is a cross-sectional view through a camera embodying the invention, FIG. 5 is a cross-section through another camera embodying the invention, FIG. 6 is a plan view of the barrier device fitted in the camera of FIG. 5, and FIG. 7 is a plan view of an alternate barrier device for fitting into the camera of FIG. 5.

DESCRIPTION OF BASIC ELECTROSTATIC CAMERA PRINCIPLES

As shown in FIG. 1, light entering a camera is focused by a lens 10 onto a photo-receptor plate or sheet of photo-receptive paper or the like 12 to form a focused image thereon.

A shutter mechanism (not shown) is provided for controlling the duration of the passage of light into the camera and aperture defining means (also not shown) is provided for determining the area of the lens through which light can pass and thus for a fixed shutter operating speed, the amount of light which enters the camera.

The plate or paper 12 is charged electrostatically by the point discharge effect from a needle-like electrode 14 which is electrically connected to one output electrode of a high voltage piezo-electric crystal generator generally designated 16. The other electrode of the generator is grounded as is the plate or paper 12.

The method of using a camera operating on the principle according to FIG. 1, comprises operating the piezo-electric crystal generator to produce a high voltage pulse of appropriate polarity to produce an electrostatic discharge for charging the surface of the plate or paper 12 either positively or negatively as the case may be. Although not shown, means is provided for removing the unwanted polarity discharge from the piezo-electric crystal generator so that instead of discharging the surface of the plate or paper as would be the case if equal and opposite polarity electrostatic charges were applied thereto, the plate or paper 12 becomes appropriately charged over at least part of its surface in a substantially uniform manner with a charge of one polarity or the other. After charging the plate or paper 12, the shutter is operated to admit light temporarily to form a focused image on the plate or paper 12. The optical image is converted into an electrical image by virtue of the discharging action of the light so that an electric image remains in which the dark areas of the optical image are replaced by regions of high polarity whereas brightly illuminated regions and white regions of the image possess little or no polarity charge after exposure to the light.

Électrical charge pattern is converted into a visible photocopy by applying toner to the surface of the plate or paper 12 in known manner and developing the photocopy print so obtained.

Description of Modification of FIG. 2 to Give More Uniform Charge Distribution It is found in practice that a camera constructed in accordance with the basic principle shown in FIG. 1 possesses a rather non-uniform electrical charge on the surface of the plate or paper 12 and FIG. 2 shows diagrammatically how a more uniform charge can be obtained on the surface of the plate or paper 12. This is achieved by locating a conductive frame 18 in front of the plate or paper 12 and causing the point discharge electrode 14 to discharge through the frame onto the plate or paper 12. The distance between the discharge point 20 and the center point of the plate or paper 12 designated by reference numeral 22 is made equal to the distance between the same point 20 and the mid-point 24 of either the lower horizontal rail of the conductive frame 18 (as shown) or the upper horizontal conductive rail of the frame 18. It is found that by incorporating a conductive frame 18 as shown in FIG. 2, the electrical charge formed on the plate or paper 12 by a single point discharge source electrode 14 is substantially uniform and considerably more uniform than is obtained by using apparatus embodying the basic concept of the invention as shown in FIG. 1.

Description of One Embodiment of Electrostatic Camera (FIG. 3).

FIG. 3 illustrates somewhat diagrammatically the essential parts of a camera embodying the invention. In the drawing those parts which are common to the apparatus shown in and described with reference to FIGS. 1 and 2 are identified by similar reference numerals.

A refinement shown in FIG. 3 comprises the provision of a rectifying diode 26 connected between the high voltage output terminal of the piezo-electric crystal generator 16 and the ground. From the high voltage end of the diode 26 the potential is conveyed to the discharge electrode 14 via a ballast-resistor 28.

Where the activating material on the plate or paper 12 comprises zinc oxide and the piezo-electric crystal generator develops a typical open circuit voltage of approximately 15,000 volts, the value of the ballast-resistor 28 is approximately 10 megohms.

The presence of the diode 26 serves to eliminate one of the voltage spikes from the piezo-electric crystal generator when the latter is operated and to leave the other voltage spike of appropriate polarity.

The provision of the resistor 28 limits the available current flowing to the electrode 14 can be regulated so as to produce the burning effect which can be produced on the sensitized photo-receptor plate or paper 12 if too high a discharge potential is employed.

FIG. 4 shows how the apparatus needed to first of all electrostatically charge the paper and then needed to develop an electrostatic image on the paper can be fitted within a standard camera housing. To this end a housing is shown at 30 with a lens 32 mounted at the front. A shutter 35 and adjustable aperture 37 (such as an iris diaphragm) of standard form are located in the nose of the housing. An inverting lens 39 is located intermediate the lens 32 and the rear of the camera.

Located within the body of the camera is a piezo-electric voltage generator 16 which is operated as shown in FIG. 3 by a lever mechanism generally designated 36. The lever mechanism 36 is preferably associated with the mechanism (not shown) controlling the opening of a shutter 35 so that the electrostatic potential needed to charge a sheet of photo-receptive paper 40 is supplied just in advance of the opening of the shutter.

A roll of zinc oxide-coated paper 38 is provided at the rear of the camera housing 30 in place of the roll of conventional sensitized film and the zinc oxide surface is exposed to the light image formed by the lens 32 and to this end is stretched across the rear of the camera housing 30.

Instead of passing straight out from the housing, the photo-receptive paper passes around a roller 42 which is spring-loaded in a forward direction so as to close off an opening in the wall of a toner bath formed in the housing and designated by reference numeral 44. So as not to interfere with the charge pattern, the wall is formed from electrically insulating material. The paper 40 is trapped lightly between the roller 42 and the vertical edges of the opening in the wall of the toner bath 44, which may contain dry toner powder or a suspension of toner in a liquid solvent base or a slurry of toner and liquid.

After passing around the roller 42 the paper extends between a pair of squeeze rollers 46 after which it passes through an elongate aperture 48 in the side of the housing 30.

After charging a piece of virgin paper 40 and exposing a light image thereon, the paper which now bears an electrostatic version of the light image, is slowly pulled through the toner bath by pulling the exposed edge of the paper designated by reference numeral 50. After a predetermined distance sufficient to cause the exposed region of the paper to pass completely through the toner bath and to be completely free from the aperture 48 the paper which has been pulled out of the camera is torn along a serrated edge 49 on an extension on one side of the aperture 48 so that a short length of paper remains exposed protruding from the aperture 48 to facilitate pulling the paper out after the next exposure. It will be found that the paper which has been pulled through the aperture 48 will bear an electrostatic photocopy/photograph of the image which has been formed thereon by the lenses 32 and 39.

A trimmer (not shown) may be provided integrally with the housing or as a separate auxiliary piece of apparatus to remove the excess paper on the lead side of each photograph/photocopy.

Compensation for Non-uniform Charge Distribution

FIGS. 5 and 6 illustrate an embodiment of the invention which includes a screen to compensate for the radial pattern of charge which results from a single point discharge electrode such as 14. The screen comprises a transparent sheet 52 (see FIG. 6) having a plurality of dots 54 printed or otherwise applied thereto, which are more densely packed near the edges and are missing entirely from the central region of the sheet 56. The sheet is located in an envelope member 58 to one side of the camera casing out of which it can be slid to the position shown in FIG. 5 to occupy a position on the axis of the lens system 32, 39. The effect is to cut down the amount of light reaching the outer regions of the area of the film 40 which is exposed when the shutter is opened relative to the amount of light reaching the centre of that area (from a uniformly illuminated field). The fall-off is selected so as to correspond as closely as possible to the fall-off of electrical charge intensity over the same area when subjected to the electric field from a single point corona discharge electrode.

The envelope member 58 will allow a second sheet to be inserted to increase the dot density in the peripheral regions and alternatively will allow a different sheet to be inserted having a lower dot density, so that the best match between electric field fall-off and light intensity fall-off can be obtained, by experiment, using a uniformly illuminated area as the object to be focused onto the film 40.

In some circumstances the central region 56 may simply comprise an opening in an opaque or semi-transparent plate as shown in FIG. 7. Here the sheet comprises an opaque plate 60 of for example metal or plastics having a central generally circular opening 62.

I claim:

1. A portable electrostatic camera comprising:
   - a light-tight housing having an aperture for admitting light;
   - a surface within the housing;
   - a shutter for controlling the passage of light through said aperture to said surface to form an optical image thereon;
   - a single point discharge electrode disposed within said housing between the aperture and the surface for electrically charging said surface prior to the formation of the optical image thereon, which surface modifies the charge to form an electrical image corresponding to the optical image;
   - a piezo-electric crystal generator disposed within said housing;
   - means for activating said piezo-electric generator to produce a high voltage charge for application to said electrode;
   - means for ensuring that charge of only one polarity is applied to said electrode; and
   - means disposed within said housing for applying a printing medium to said surface for retention thereon in dependence on the level of electrical charge remaining at different points over said surface.

2. A camera as set forth in claim 1 in which the said surface comprises a sheet of sensitized paper.

3. A camera as set forth in claim 2 comprising means within the housing for fixing the printing medium on those areas of the surface to which the printing medium adheres due to the presence of charge thereon.

4. A camera as set forth in claim 3 further comprising a roll of paper located within the housing with a section of the roll constituting the said surface within the housing and an aperture in the housing through which a further section protrudes to allow the paper to be pulled from the roll after exposure.

5. A camera as set forth in claim 4 further comprising cutting means for cutting the paper after the latter has been pulled through the housing to reveal the section which has been charged and exposed and developed.

6. A camera as set forth in claim 1 in which the said surface comprises a sensitized plate.

7. A camera as set forth in claim 1 in which an additional electrode is situated within the camera housing and close to the said surface on which the electrical image is formed to assist in the transfer of printing medium thereto.

8. A camera as set forth in claim 7 in which the additional electrode which is located close to the said surface while the printing medium is transferred thereto is maintained at opposite polarity to the polarity of the electrode from which charge is received by the said surface prior to exposure to the optical image.

9. A camera as set forth in claim 1 wherein the said surface constitutes a plate wholly contained within the housing which is coated with a layer of reactive material which when electrically charged becomes photosensitive, and on which an electrical image is formed corresponding to a light image incident thereon.

10. A camera as set forth in claim 9 in which the reactive material is cadmium sulphide or selenium.

11. A camera as set forth in claim 9 further comprising means for distributing printing medium onto the electrically charged photo-sensitive surface of the permanent plate thereby to cause printing medium to adhere to the charged regions of the said surface of the plate, means for causing at least some of the adhering printing medium to be transferred from the said surface onto a sheet material which is brought into juxtaposition therewith and means for fixing the printing medium onto the sheet so as to produce a permanent electrostatic print thereon.

12. A camera as set forth in claim 9 further comprising means for bringing sensitized sheet material into contact with the electrical charge image on the said surface, means for causing the electrical charge pattern to be transferred to the said sensitized sheet material, means provided for applying printing medium to the surface of the sensitized sheet material bearing the transferred charge pattern and means for fixing the printing medium thereon.

13. A camera as set forth in claim 12 in which the sensitized sheet material comprises zinc oxide coated paper.

14. A camera as set forth in claim 1 further comprising an electrically conductive frame located just in advance of the said surface on the same side thereof as is situated the electrode means for charging the said surface so that the ionisation from the said electrode has to pass through the frame to reach the said surface, the frame being maintained at the same electrical potential and polarity as the said surface.

15. A camera as set forth in claim 1 further comprising a conventional optical system within the camera housing for producing an image on the said surface, and an additional lens over and above the lenses forming a conventional camera optical system, to produce an inverted real optical image on the surface.

16. A camera as set forth in claim 1 further comprising a transparent sheet having formed thereon a large number of very small opaque equally spaced apart dots which is adapted to be inserted in front of the said surface prior to the image exposure.

17. A portable electrostatic camera as set forth in claim 1 further comprising a generally opaque barrier between the said aperture and the said surface on which the image is to be formed, the barrier having an optical window the shape and dimensions of which are such that, together with the existing imperfections of the optical system forming the image, the variation of intensity of light over the said surface, when lit from a uniformly illuminated plain image is similar to the variation of electrical charge intensity over the same surface from the said electrode means.

18. A portable electrostatic camera as set forth in claim 17 wherein the windowed barrier is adjustable so that the most appropriate distribution of light over the surface can be obtained from a uniformly illuminated field.

19. A portable electrostatic camera as set forth in claim 17, wehrein said barrier comprises a transparent sheet having a plurality of opaque dots applied thereto which are more densely packed near the edges of said sheet and which are missing entirely from the center region of said sheet.

20. A portable electrostatic camera as set forth in claim 17, wherein said barrier comprises a non-transparent plate having an aperture formed therethrough.

21. A portable electrostatic camera comprising a light-tight housing having an aperture for admitting light and an optical axis;

a surface within the housing;

a shutter for controlling the passage of light through said aperture to said surface to form an optical image thereon;

a single point discharge electrode disposed within said housing between the aperture and the surface for electrically charging said surface prior to the formation of the optical image thereon, which surface modifies the charge to from an electrical image corresponding to the optical image, said electrode being located on the optical axis of said camera relative to said surface to be exposed and wherein any relative movement between the surface to be exposed and the electrode is solely for the purpose of moving a fresh unexposed section of said surface into said image plane of said camera prior to establishment of an electric field from said electrode; and means disposed within said housing for applying a printing medium to said surface for retention thereon in dependence on the level of electrical charge remaining at differenct points over said surface.

* * * * *

UNITED STATES PATENT AND TRADEMARK OFFICE

CERTIFICATE OF CORRECTION

PATENT NO. : 4,198,139

DATED : APRIL 15, 1980

INVENTOR(S) : JOHN MICHAEL PAYNE

It is certified that error appears in the above—identified patent and that said Letters Patent is hereby corrected as shown below:

Column 2, line 11, delete "the" (first occurrence). Column 5, line 62, change "centre" to --center--. Column 9, line 49, change "centre" to --center--. Column 11, line 21, change "ionisation" to --ionization--. Column 12, line 9, change "wehrein" to --wherein--; line 29, change "from" to --form--; line 42, change "differenct" to --different--.

Signed and Sealed this

*Fifth* Day of *August 1980*

[SEAL]

*Attest:*

SIDNEY A. DIAMOND

*Attesting Officer* *Commissioner of Patents and Trademarks*

Disclaimer 4,198,139.—*John Michael Payne*, Peterborough, England. ELECTROSTATIC CAMERAS. Patent dated Apr. 14, 1980. Disclaimer filed Nov. 3, 1980, by the inventor.

Hereby enters this disclaimer to claims 7, 8, 11 and 12 of said patent.

[*Official Gazette January 6, 1981.*]